Dec. 4, 1951  R. D. MALIN  2,577,537
OSCILLATING HEADER TUBE ORCHARD SPRAYER
Filed Oct. 18, 1949  4 Sheets-Sheet 1
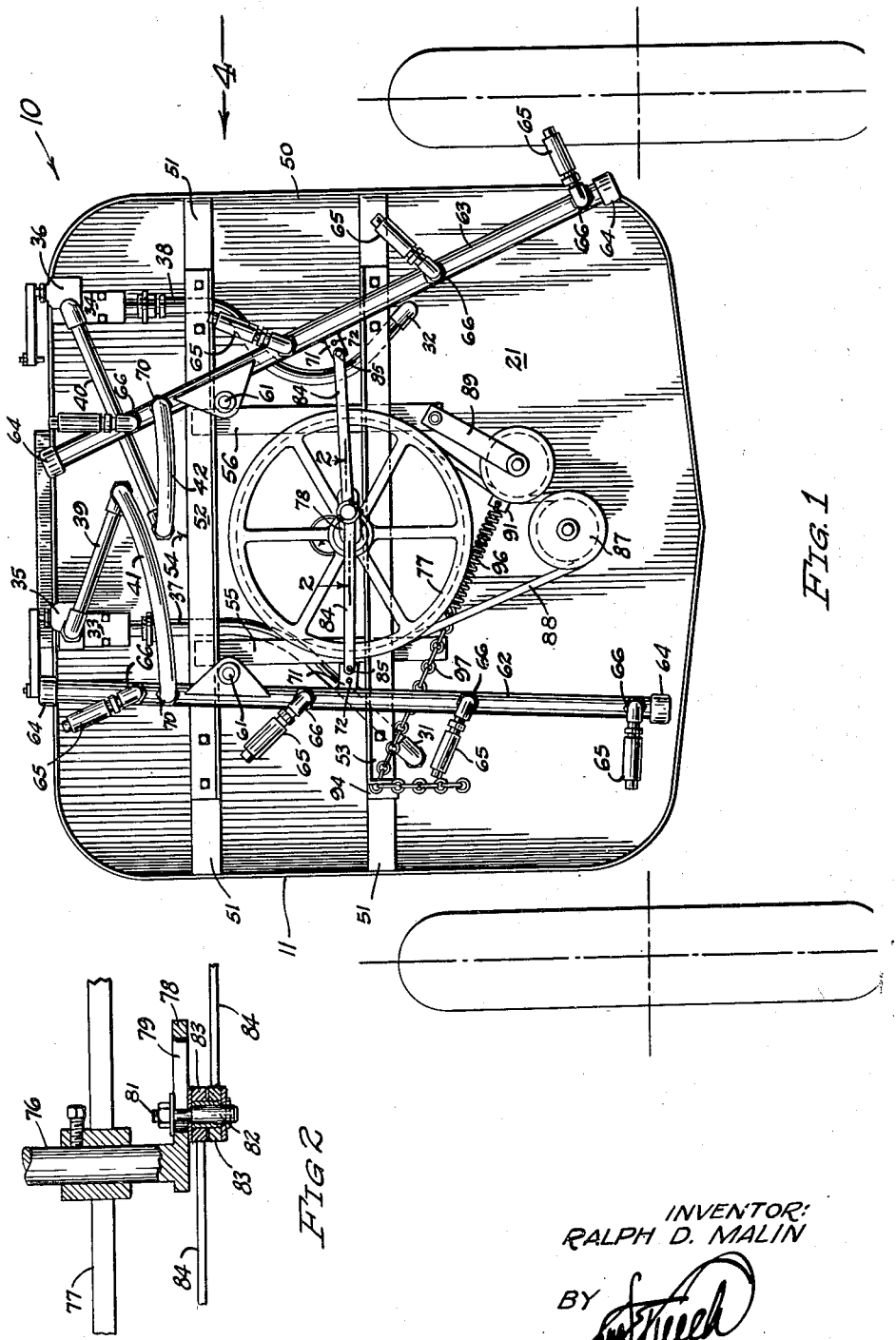
INVENTOR:
RALPH D. MALIN
BY 
ATTORNEY Dec. 4, 1951 R. D. MALIN 2,577,537
OSCILLATING HEADER TUBE ORCHARD SPRAYER
Filed Oct. 18, 1949 4 Sheets-Sheet 2

INVENTOR:
RALPH D. MALIN
BY
ATTORNEY

Dec. 4, 1951 R. D. MALIN 2,577,537
OSCILLATING HEADER TUBE ORCHARD SPRAYER
Filed Oct. 18, 1949 4 Sheets-Sheet 4

INVENTOR:
RALPH D. MALIN
BY
ATTORNEY

Patented Dec. 4, 1951

2,577,537

UNITED STATES PATENT OFFICE 2,577,537

OSCILLATING HEADER TUBE ORCHARD SPRAYER

Ralph D. Malin, East Lansing, Mich., assignor to Food Machinery and Chemical Corporation, San Jose, Calif., a corporation of Delaware Application October 18, 1949, Serial No. 122,009

8 Claims. (Cl. 299—37)

1

This invention relates to the art of agricultural spraying and is particularly useful in orchard spraying.

To distribute spray material from opposite sides of a spray rig in sufficient volume and with the proper dispersion to thoroughly coat the foliage surfaces throughout the rows of trees between which the rig is travelling, the practice has been widely followed of employing a series of individual nozzles vertically spaced on each side of the rig and then periodically changing the angles of elevation of the individual nozzles as the rig progresses.

This system achieved good results, but had the drawback of wearing out the connections between the individual nozzles and the pipes supplying them with spray liquid. Where hose connections were used, these were short and soon failed from the repeated bending which they were thus subjected to. Where the nozzles were connected to a spray mast by swivel joints, the latter tended to fail prematurely due to abrasive material in the spray liquid being admitted between the wearing surfaces of the joints owing to the relatively large amount of flexing of these joints in order to swing the nozzles individually and at frequent intervals between different angles of elevation.

It is an object of the present invention to provide an orchard sprayer which is adapted to be mounted on a spray rig and effect the discharge of spray liquid from each side of the rig through a series of individual nozzles in vertically spaced relation which will be free from the difficulties previously met with in this general type of apparatus.

It is a further object to provide such a sprayer which may be readily converted from a so-called low sprayer which is adapted for spraying trees which are of moderate height to a high sprayer which is adapted to spray trees of the maximum height ordinarily met with in orchard spraying.

Still another object of this invention is to provide such an agricultural sprayer which affords a wide degree of flexibility in the adjustment of the angles of the individual nozzles with reference to each other without affecting the periodic changing of the angles of elevation of all the nozzles incidental to the operation of the sprayer.

Yet another object of the invention is to provide such an agricultural sprayer in which the maximum and minimum angles of elevation of the nozzles on either side of the sprayer may be altered without changing the relative angles of the individual nozzles with reference to each other.

2

It is another object of the invention to provide such an agricultural sprayer in which the nozzles are vertically spaced on a header tube which is pivotally mounted on the sprayer and wherein said header tube is periodically oscillated to swing said nozzles between their maximum and minimum angles of elevation.

Still another object of the invention is to provide such an agricultural sprayer in which a pair of said header tubes are used and in which they may be released from the means for oscillating the same and swung about their pivotal mountings into approximately horizontal position and the nozzles turned downwardly to accomplish the spraying of a ground crop.

Yet another object of the invention is to provide an agricultural sprayer which is effective in orchards and groves in which the foliage of the trees overhangs the spaces between the rows along which the sprayer must travel.

The manner of accomplishing the foregoing objects as well as further objects and advantages will be made manifest in the following description and in the accompanying drawings in which, Fig. 1 is the rear elevational view of a preferred embodiment of the invention.

Fig. 2 is an enlarged cross sectional detailed view taken on the line 2—2 of Fig. 1.

Figure 3:
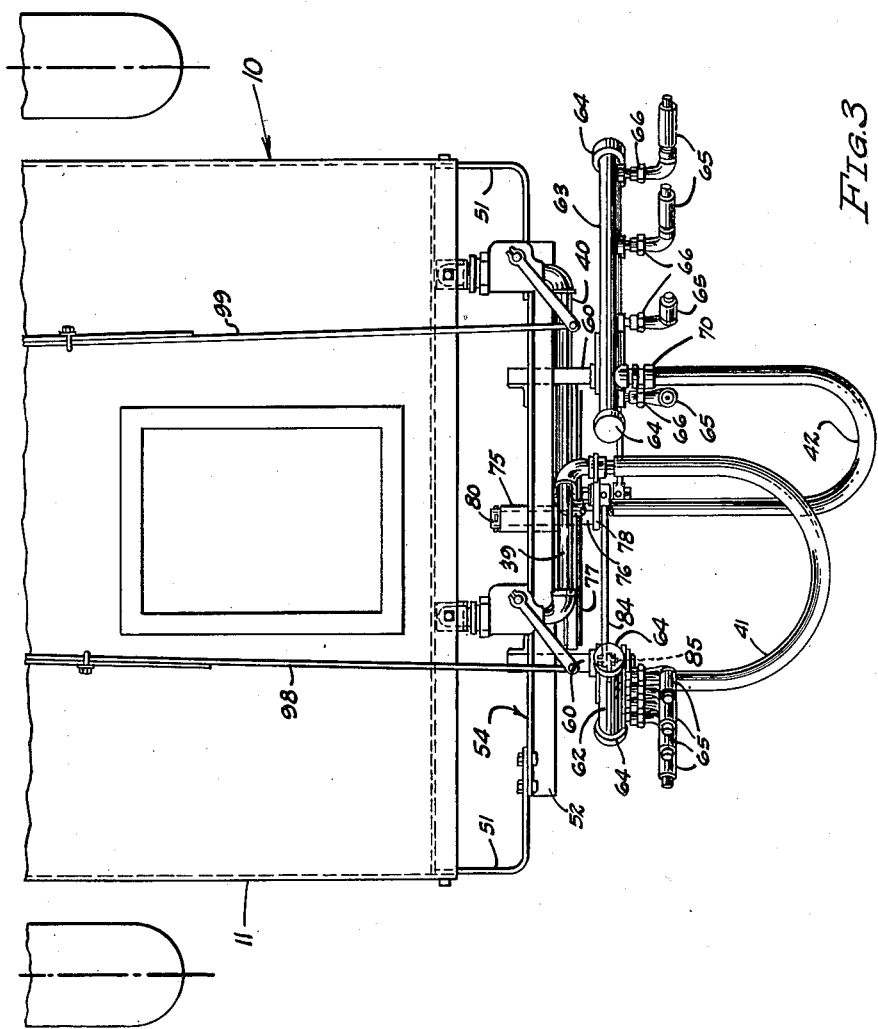
Fig. 3 is a plan view of Fig. 1.
Figure 4:
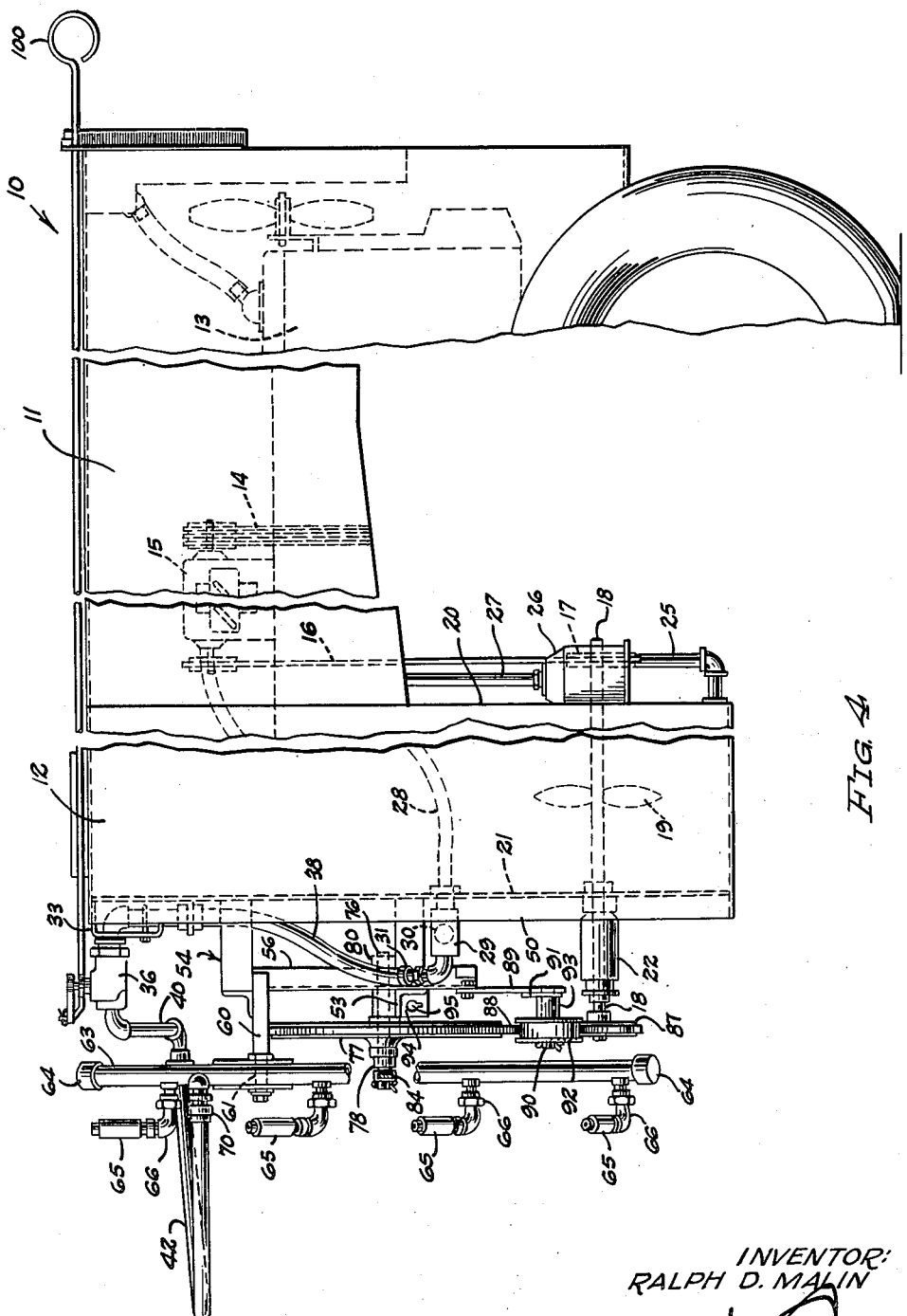
Fig. 4 is a side elevational view of Fig. 1 taken in the direction of arrow 4.

Referring specifically to the drawings, the invention is shown therein as embodied in a spray rig 10 which has a frame 11 providing a spray solution tank 12 and having mounted thereon a power plant 13 which is connected by a series of drive belts 14 with a pump 15, the latter being connected by a belt 16 with a pulley 17 on a shaft 18 of an agitator 19. The shaft 18 journals in suitable bearings provided on a front wall 20 and a rear wall 21 of the tank 12 and extends out forwardly and rearwardly from said walls. A suitable stuffing box (not shown) prevents the leakage of spray material from the tank 12 between the wall 20 and the shaft 18 while a stuffing box 22 prevents leakage of liquid from this tank between wall 21 and said shaft.

Spray material is sucked by the pump 15 from the tank 12 through a pipe 25, a filter 26, and a pipe 27, and is discharged through a pipe 28 to a fitting 29 which is mounted on the wall 21 and has a cross pipe 30 leading therefrom and a hose connection 31. The opposite end of cross pipe 30 is provided with a hose connection 32.

Mounted on brackets 33 and 34 are valves 35 and 36, said brackets being fixed to the tank 12. The valves 35 and 36 are connected by hoses 37 and 38 with the hose connections 31 and 32 so that liquid spray material is delivered under pressure from the pump 15 to these valves. These valves when open connect the hoses 37 and 38 respectively with pipes 39 and 40 opposite ends of which connect with relatively long flexible hoses 41 and 42.

Secured on a perimetric flange 50 formed on the rear wall 21 of the tank 12 are pairs of angle brackets 51 to which are attached opposite ends of angle iron members 52 and 53 of a structural steel frame 54. This frame also includes vertical members 55 and 56 which are welded to the members 52 and 53. Welded to the angle iron member 52 and vertical members 55 and 56 are stub shafts 60 the outer ends of which are machined away to provide axles 61 for header tubes 62 and 63. Opposite ends of these tubes are closed by caps 64. Each header tube is also provided with a series of high pressure spray nozzles 65 each of which has a pivotal mount 66 connecting this nozzle with the interior of the header tube and yet permitting rotation of the nozzle about its connection 66 to vary the angular relation of said nozzle with its header tube.

The illustrated embodiment of the invention has four nozzles 65 on each of the header tubes 62 and 63 and the practice is to turn these nozzles about their mountings 66 as shown in Fig. 1, at different angles relative to each other so that there is a considerable divergence between the axes of the uppermost and lowermost of the nozzles 65 on each of the header tubes 62 and 63.

A hose connection 70 is provided on each of these tubes and the hoses 41 and 42 are turned 180° and connected therewith so as to deliver spray liquid under high pressure to the header tubes when the valves 35 and 36 are opened. The header tubes 62 and 63 are also provided with inturned lugs 71 each of which has a plurality of pivot holes 72.

Welded onto the angle iron 53 at its mid point is a bearing 75 in which is journaled a crank shaft 76 on which is fixed a large diameter pulley 77. The crank shaft has a crank arm 78, in which a slot 79 is provided. Fixed on the rear end of the shaft 76 is a collar 80 for retaining this shaft in bearing 75. Secured to the crank arm 78, for radial adjustment thereon, by a nut 81 is crank pin 82. Rotatable on this crank pin are head bearings 83 of pitmen 84 the opposite ends of which are pivotally connected by bolts 85 with certain of the holes 72 in the lugs 71.

Fixed on the rearward projecting end of shaft 18 is a small diameter pulley 87 which lies in the same plane as large pulley 77 and is adapted to have a drive connection therewith through an endless belt 88 trained about these pulleys. Pivoted on a lower extension of the frame member 56 is an idle arm 89, the free end of which carries a pin 90 which rotatably carries a spring link 91 and an idle pulley 92, these being spaced by a spacer sleeve 93.

Welded on the left end of angle iron 53 is a keeper lug 94 having a key-hole shaped aperture 95 therein. Connected at one of its ends to the link 91 is a coil spring 96 the opposite end of which connects with a link chain 97, the latter passing through the aperture 95 and making a locking connection with the lower portion of this aperture when pulled through said aperture and then released. The chain 97 thus provides a means of applying a variable degree of resilient pressure to the idle pulley 92 in a direction to tighten the belt 88.

It is to be noted (see Fig. 3) that the hoses 41 and 42 are relatively long so that the flexing to which they are subjected by the oscillation of header tubes 62 and 63 does not seriously affect the life of these hoses. With the arrangement of the present invention, therefore, it is possible to periodically vary the angles of elevation of all of the nozzles 65 on both sides of the spray rig 10 without subjecting the connections between these nozzles and their respective header tubes to wear.

In fact, the only wear which these connections need sustain is that incidental to adjustments of the angle of elevation which each of these nozzles has with relation to the header tube on which it is mounted. Thus the present invention eliminates the excessive wear previously met with in spray rigs of this general type of the individual connections between the nozzles and the tubes from which they receive their supply of liquid.

The spraying apparatus, as shown in Fig. 1, 2, 3, and 4, is practically entirely hid behind the tank 11 of the spray rig 10 so that it will not catch on overhanging branches in groves where the foliage of the trees overhangs the path between the rows along which the spray rig must travel. The sprayer of my invention is thus adaptable to be used under these conditions and effect a thorough penetration of the foliage by spray directed from the nozzles 65 at various elevations and at a variety of angles, the latter fluctuating with the periodic oscillation of the header tubes 62 and 63.

While particularly useful when hid behind the tank 11 of the spray rig 10 the apparatus of my invention is capable of being modified by the addition of extension tubes 105 coupled onto the upper ends of the header tubes 62 and 63. Each of these extension tubes is of the same diameter as the header tubes 62 and 63, is fitted with a cap 106 at one end and a coupling 107 at the other, and has nozzles 65 fitted thereon in a similar manner to that in which such nozzles are shown fitted on to the header tubes 62 and 63. When thus modified, the apparatus of my invention is adapted for spraying trees which are somewhat higher than those which can be reached by spray from the apparatus as illustrated in the drawings.

Figures 5, 6:
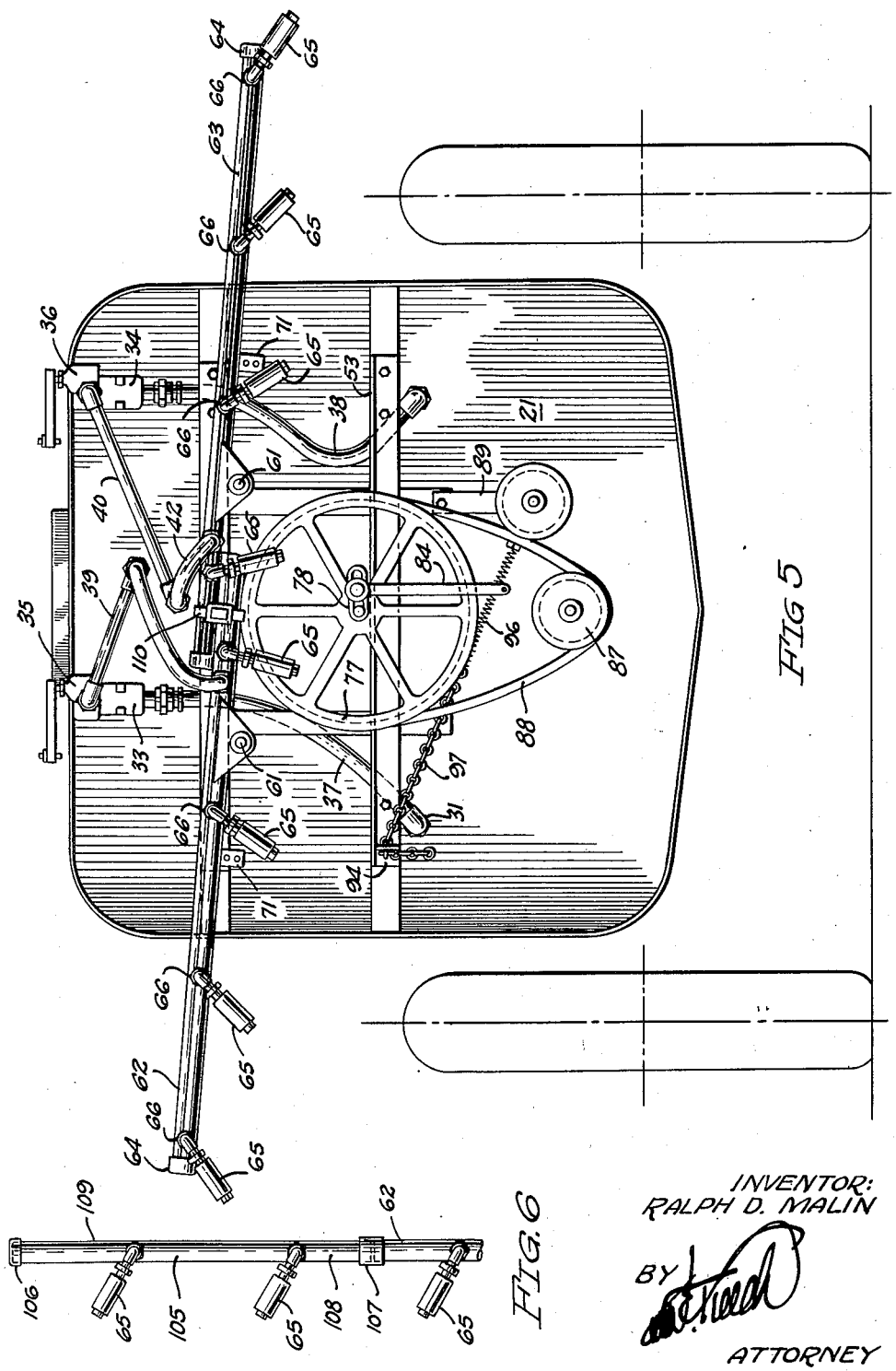
Fig. 5 is a view similar to Fig. 1 and showing the invention adapted for spraying ground crops.
Fig. 6 is an elevational view of a header tube extension suitable for use in modifying the invention from a low sprayer to a high sprayer or in extending the length of the header tubes when these are employed for spraying ground crops.

It is also possible to adapt the sprayer of my invention for the spraying of ground crops, this adaptation being illustrated in Fig. 5. To accomplish this adaptation, the pins 85 connecting the pitmen 84 with the lugs 71 are removed, the idler 92 is relaxed so that power is no longer transmitted from the small pulley 87 to the pulley 77, and the header tubes 62 and 63 are rotated to a substantially horizontal position where the upper ends overlap and are secured together as by a strap 110. The nozzles 65 are now all adjusted into downward and outward inclinations whereby spray therefrom is properly distributed over the ground as the spray rig travels thereover.

It is to be noted that the nozzles 65 are uniformly spaced apart on the header tubes 62 and 63 and that the upper ends of these header tubes extend above their connections with the uppermost of the nozzles 65 so as to afford protection to these nozzles from foliage sweeping over the top of the tank 11. Such protection is not necessary for the lowermost of the nozzles 65 thereby permitting the swivel connections for these to be located close to the lower ends of these header tubes.

To secure proper spacing of nozzles 65 in both uses above described of the extension tubes 105, the nozzles 65 on these tubes are so located as to provide end sections 108 and 109 which are located respectively between opposite ends of the extension tubes 105 and the adjacent nozzles 65 provided thereon. The section 108 is shorter than the section 109 and has the coupling 107 thereof, as shown in Fig. 6 screwed thereon.

When an extension tube 105 is applied to the upper end of one of the header tubes 62 and 63 for converting the invention from a low sprayer to a high sprayer, the extension tube section 108 is thus seen to be of the proper length when added to the uppermost portion of that header tube, as shown in Fig. 6, to space the lowermost nozzle 65 on that extension tube 105 from the uppermost nozzle 65 on said header tube the same distance as the uniform vertical spacing of the other nozzles 65 on said header tubes.

When applying the extension tubes 105 to what are normally the lower ends of the header tubes 62 and 63 when these are disposed substantially horizontally. as shown in Fig. 5, the caps 106 and couplings 107 on the extension tubes 105 are reversed so that the coupling 107 appears on end section 109 and the cap 106 closes section 108. As thus modified, the extension tubes 105 are applied to what are now the outer ends of the header tubes 62 and 63 to extend these laterally while the invention is being employed for spraying ground crops. The tubular end sections 109 are just the proper length so that when said extensions are so applied to the header tubes 62 and 63 all the nozzles 65 along the extended header tubes are uniformly spaced apart.

While I have shown the header tubes 62 and 63 slightly out of horizontal position as they are held together by strap 110 in Fig. 5, it is to be understood that the upper ends of the header tubes may be shortened if desired so as not to interfere with these tubes being simultaneously moved into true horizontal alignment with the upper ends of the tubes abutting against each other and held together by a strap or a suitable clamp fixed on the frame whereby all the nozzles 65 wil be located at the same distance from the ground when using the invention in a ground crop spraying operation.

The spray nozzles 65 are of the well known type used on multiple gun spray rigs in which the character of the spray issuing from each gun may be modified or entirely shut off by rotation of the nozzle itself relative to its mounting. This permits a high degree of flexibility in the character of the aggregate of the spray produced by all the nozzles 65 on a given header tube.

One of the outstanding advantages of the present invention is that due to the oscillation of each header tube on which the nozzles are mounted, a smaller number of nozzles can be used to deliver a given amount of spray material and this enables the use of nozzles with relatively large orifices producing large spray droplets which gives much better penetration of the trees by the spray.

I claim:

1. An orchard sprayer adapted to be mounted on a spray rig and comprising a frame; a header tube pivotally mounted on said frame on an axis substantially parallel with the direction of travel of said rig; a series of spray nozzles provided in vertically spaced relation on said tube and individually connected to and receiving liquid therefrom, said nozzles being individually rotatable relative to said tube to vary the angle of inclination of each of said nozzles with respect to the others of said nozzles; a power transmission mechanism mounted on said frame for oscillating said header tube about said axis periodically; and means for supplying spray liquid under pressure to said header tube during said oscillation.

2. An orchard sprayer adapted to be mounted on a spray rig and comprising a frame; a pair of header tubes pivotally mounted on said frame in upright spaced relation; a series of nozzles provided on each of said tubes to receive liquid spray material therefrom, said nozzles on each of said tubes being angularly adjustable relative to each other; a power transmission mechanism mounted on said frame for oscillating said tubes in a plane transverse to the direction of travel of said spray rig; and spray liquid supply means connected to said tubes and supplying spray liquid to the same and through said tubes to said nozzles during the oscillation of said tubes.

3. An orchard sprayer adapted to be mounted on a spray rig and comprising a frame; a pair of header tubes pivotally mounted on said frame in upright spaced relation; a series of nozzles provided in vertically spaced relation on each of said tubes to receive liquid spray material therefrom, said nozzles on each of said tubes being angularly adjustable relative to each other; a power transmission mechanism mounted on said frame and connected to said tubes for oscillating the latter in a plane transverse to the direction of travel of said spray rig; adjustment means effective to vary the angular relation between said tubes in the plane of their oscillation; and spray liquid supply means connected to said tubes and supplying spray liquid to the same and through said tubes to said nozzles during the oscillation of said tubes.

4. A combination as in claim 3 having pitmen to connect said transmission to said tubes, and in which said adjustment means operates by varying the points of connection between said pitmen and said header tubes.

5. A combination as in claim 4 in which lugs are provided on said tubes, each of said lugs having a plurality of holes; and means for selectively pivotally connecting said pitmen to said lugs by pins passing through certain of said holes therein.

6. An orchard sprayer adapted to be mounted on a spray rig and comprising a frame; a header tube pivotally mounted on said frame on an axis substantially parallel with the direction of travel of said rig; a series of spray nozzles provided in vertically spaced relation on said tube and individually connected to and receiving liquid therefrom; said nozzles being individually rotatable relative to said tube to vary the angle of inclination with respect to each other; said header tube being provided with an extension tube on which one or more nozzles are similarly mounted, said extension tube being adapted to be added to the upper end of said header tube to produce a high sprayer.

7. An orchard sprayer adapted to be mounted on a spray rig and comprising a frame; a pair of header tubes each including upper and lower sections pivotally mounted on said frame in upright spaced relation; a series of nozzles provided on each of said tubes to receive liquid spray material therefrom, said nozzles on each of said tubes bing angularly adjustable relative to each other, said header tubes extending a substantial distance above the spray rig on which they are mounted and in which upper sections of said tubes are removable whereby said sections thereof may be removed to form a low sprayer, lower sections of the header tubes being substantially masked by said spray rig to prevent low hanging branches under which said spray rig must pass in its spraying operations from catching on said header tubes; a power transmission mechanism mounted on said frame for oscillating said tubes in a plane transverse to the direction of travel of said spray rig; and spray liquid means connected to said tubes and supplying spray liquid to the same and through said tubes to said nozzles during the oscillation of said tubes.

8. An orchard sprayer adapted to be mounted on a spray rig and comprising a frame; a pair of header tubes pivotally mounted on said frame in upright spaced relation; a series of nozzles provided on each of said tubes to receive liquid spray material therefrom; a power transmission mechanism mounted on said frame and connected to said header tubes at points spaced from said pivotal mountings for oscillating said tubes in a plane transverse to the direction of travel of said spray rig; and spray liquid supply means connected to said tubes for supplying liquid thereto during said oscillation.

RALPH D. MALIN.

REFERENCES CITED

The following references are of record in the file of this patent:

UNITED STATES PATENTS

| Number | Name | Date |
|---|---|---|
| 1,023,852 | Johnson | Apr. 23, 1912 |
| 2,367,135 | Moon et ol. | Jan. 9, 1945 |
| 2,429,374 | Shade | Oct. 21, 1947 |
| 2,444,367 | Prescott | June 29, 1948 |

FOREIGN PATENTS

| Number | Country | Date |
|---|---|---|
| 365,451 | France | June 27, 1906 |